(12) United States Patent
Perkins et al.

(10) Patent No.: US 6,830,323 B2
(45) Date of Patent: Dec. 14, 2004

(54) RESTRICTING FLASH SPREAD WHEN WELDING HOUSING HALVES OF CARTRIDGE TOGETHER

(75) Inventors: Mark D. Perkins, Wayland, NY (US); Diana C. Petranek, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/217,742

(22) Filed: Aug. 13, 2002

(65) Prior Publication Data

US 2004/0032470 A1 Feb. 19, 2004

(51) Int. Cl.[7] .................................. B41J 2/175
(52) U.S. Cl. ........................................ 347/86
(58) Field of Search ............... 347/86, 87, 108; 360/132; 399/111; 118/268

(56) References Cited

U.S. PATENT DOCUMENTS

| | | | |
|---|---|---|---|
| 4,183,031 A | | 1/1980 | Kyser et al. |
| 4,506,276 A | | 3/1985 | Kyser et al. |
| 4,556,012 A | * | 12/1985 | Scrudato ............... 118/268 |
| 4,853,708 A | | 8/1989 | Walters |
| 4,907,019 A | | 3/1990 | Stephens |
| 4,961,088 A | | 10/1990 | Gilliland et al. |
| 5,138,344 A | | 8/1992 | Ujita |
| D341,157 S | | 11/1993 | Kitahara et al. |
| 5,266,968 A | | 11/1993 | Stephenson |
| 5,293,913 A | | 3/1994 | Preszler |
| 5,406,320 A | | 4/1995 | Durst et al. |
| 5,408,746 A | | 4/1995 | Thoman et al. |
| 5,410,641 A | | 4/1995 | Wakabayashi et al. |
| 5,467,118 A | * | 11/1995 | Gragg et al. ............... 347/87 |
| 5,506,611 A | | 4/1996 | Ujita et al. |
| 5,519,422 A | | 5/1996 | Thoman et al. |
| 5,530,531 A | | 6/1996 | Girard |
| 5,552,816 A | | 9/1996 | Oda et al. |
| 5,561,450 A | | 10/1996 | Brewster, Jr. et al. |

(List continued on next page.)

FOREIGN PATENT DOCUMENTS

| | | |
|---|---|---|
| DE | 371 275 | 3/1923 |
| DE | 3405164 A1 | 8/1985 |
| JP | 58 074315 | 5/1983 |
| JP | 359-214656 | 12/1984 |
| JP | 11 058865 | 3/1999 |
| JP | 2000 318046 | 11/2000 |
| JP | 2001 047514 | 6/2001 |

OTHER PUBLICATIONS

Land W: "Einfluss Der Fuegenahtgestaltung Auf Das Schweissverhalten" Plastverarbeiter, Zechner Und Huethig Verlag GMBH. Speyer/Rhein, DE, vol. 34, NR. 9, pp. 798–800 XP000677089 ISSN: 0032–1338; p. 799; figure 6.

Saechtling: International Plastics Handbook: 1985, MacMillan Publih Co., New York XP 002259510; p. 122, line 8–9; figure 77.

*Primary Examiner*—Anh T. N. Vo
(74) *Attorney, Agent, or Firm*—Roger A. Fields; Mark G. Bocchetti

(57) ABSTRACT

A cartridge comprises a pair of housing portions having an opening at a seam formed between the housing portions, a memory chip accessible via the opening to permit electrical contact to be made with the memory chip, and a protuberance projecting from one of the housing portions and welded to the other housing portion within a cavity of the other housing portion. Since a flash which is formed at the weld can spread towards the seam including in the vicinity of the opening, the protuberance and the cavity are mutually dimensioned to restrict the flash substantially to within the cavity. This prevents the flash from spreading into the seam and bulging outward at least in the vicinity of the opening, which could interfere with formation of the seam and making electrical contact with the memory chip.

13 Claims, 13 Drawing Sheets

U.S. PATENT DOCUMENTS

| | | |
|---|---|---|
| 5,610,635 A | 3/1997 | Murray et al. |
| 5,666,146 A | 9/1997 | Mochizuki et al. |
| 5,691,753 A | 11/1997 | Hilton |
| 5,710,579 A | 1/1998 | Hahs et al. |
| 5,721,576 A | 2/1998 | Barinaga |
| 5,745,137 A | 4/1998 | Scheffelin et al. |
| 5,751,322 A | 5/1998 | Miller et al. |
| 5,788,388 A | 8/1998 | Cowger et al. |
| 5,825,387 A | 10/1998 | Cowger et al. |
| 5,825,388 A | 10/1998 | Sasaki |
| 5,835,817 A | 11/1998 | Bullock et al. |
| 5,860,363 A | 1/1999 | Childers et al. |
| 5,880,764 A | 3/1999 | Barinaga |
| 5,920,333 A | 7/1999 | Bates |
| 5,956,057 A | 9/1999 | Childers et al. |
| 5,959,647 A | 9/1999 | Claramunt et al. |
| 6,000,773 A | 12/1999 | Murray et al. |
| 6,003,985 A | 12/1999 | Bekki |
| 6,019,449 A | 2/2000 | Bullock et al. |
| 6,059,403 A | 5/2000 | Burgin |
| 6,065,826 A | 5/2000 | Robinson et al. |
| 6,102,533 A | 8/2000 | Nozawa et al. |
| 6,115,570 A * | 9/2000 | Kilian et al. ................. 399/111 |
| 6,130,695 A | 10/2000 | Childers et al. |
| 6,151,039 A | 11/2000 | Hmelar et al. |
| 6,155,678 A | 12/2000 | Komplin et al. |
| 6,164,743 A | 12/2000 | Hmelar et al. |
| 6,168,262 B1 | 1/2001 | Clark et al. |
| 6,183,077 B1 | 2/2001 | Hmelar et al. |
| 6,199,973 B1 | 3/2001 | Bartolome et al. |
| 6,199,977 B1 | 3/2001 | Komplin et al. |
| 6,203,147 B1 | 3/2001 | Battey et al. |
| 6,209,996 B1 | 4/2001 | Gasvoda et al. |
| 6,220,702 B1 * | 4/2001 | Nakamura et al. ............. 347/86 |
| 6,227,638 B1 | 5/2001 | Childers et al. |
| 6,227,643 B1 | 5/2001 | Purcell et al. |
| 6,227,663 B1 | 5/2001 | Santhanam et al. |
| 6,243,116 B1 | 6/2001 | Kotaki et al. |
| 6,280,025 B1 * | 8/2001 | Beckstrom et al. ............ 347/86 |
| 6,416,166 B1 | 7/2002 | Robinson et al. |
| 6,532,133 B1 * | 3/2003 | Kaneda et al. .............. 360/132 |

* cited by examiner

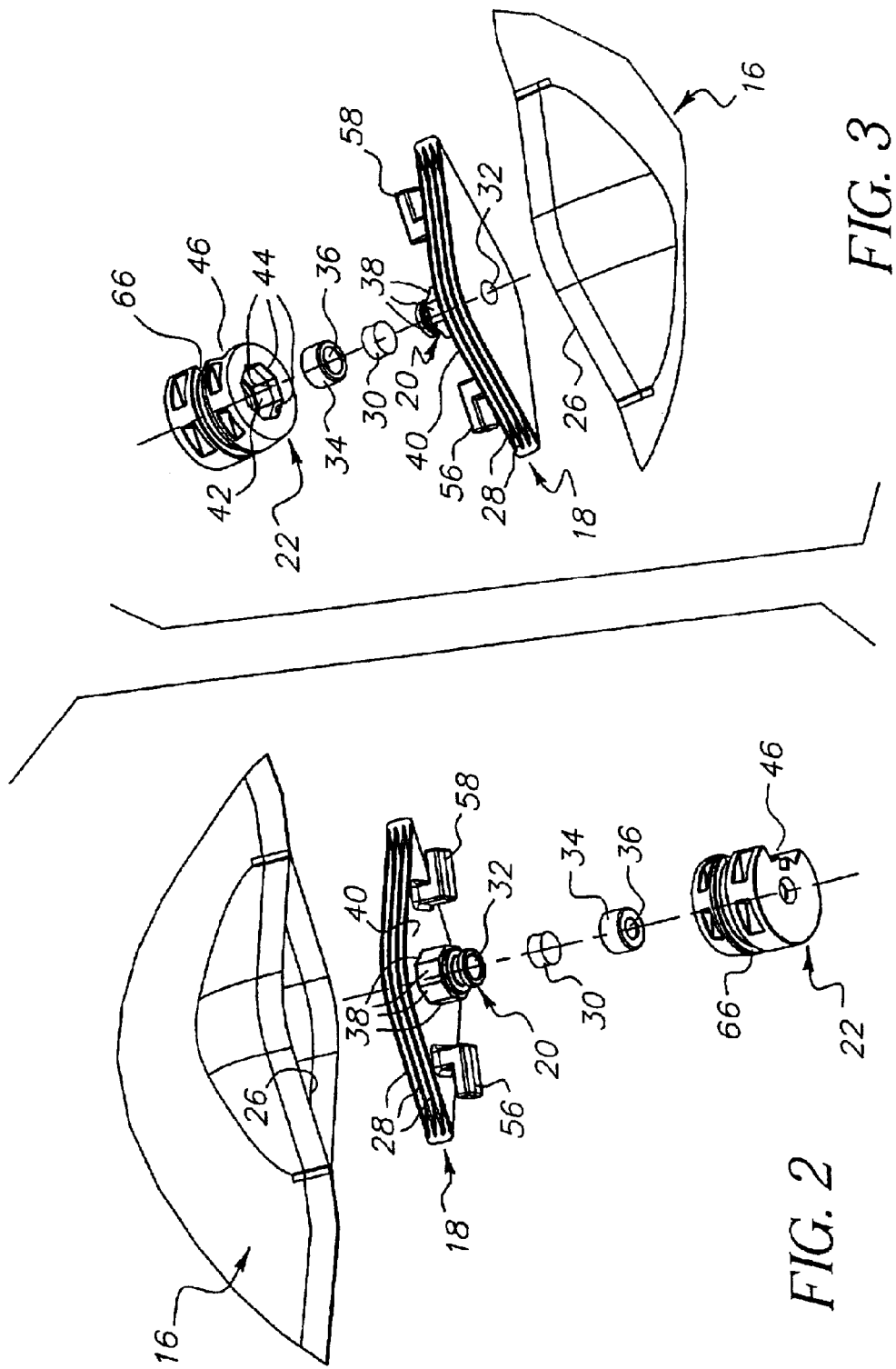

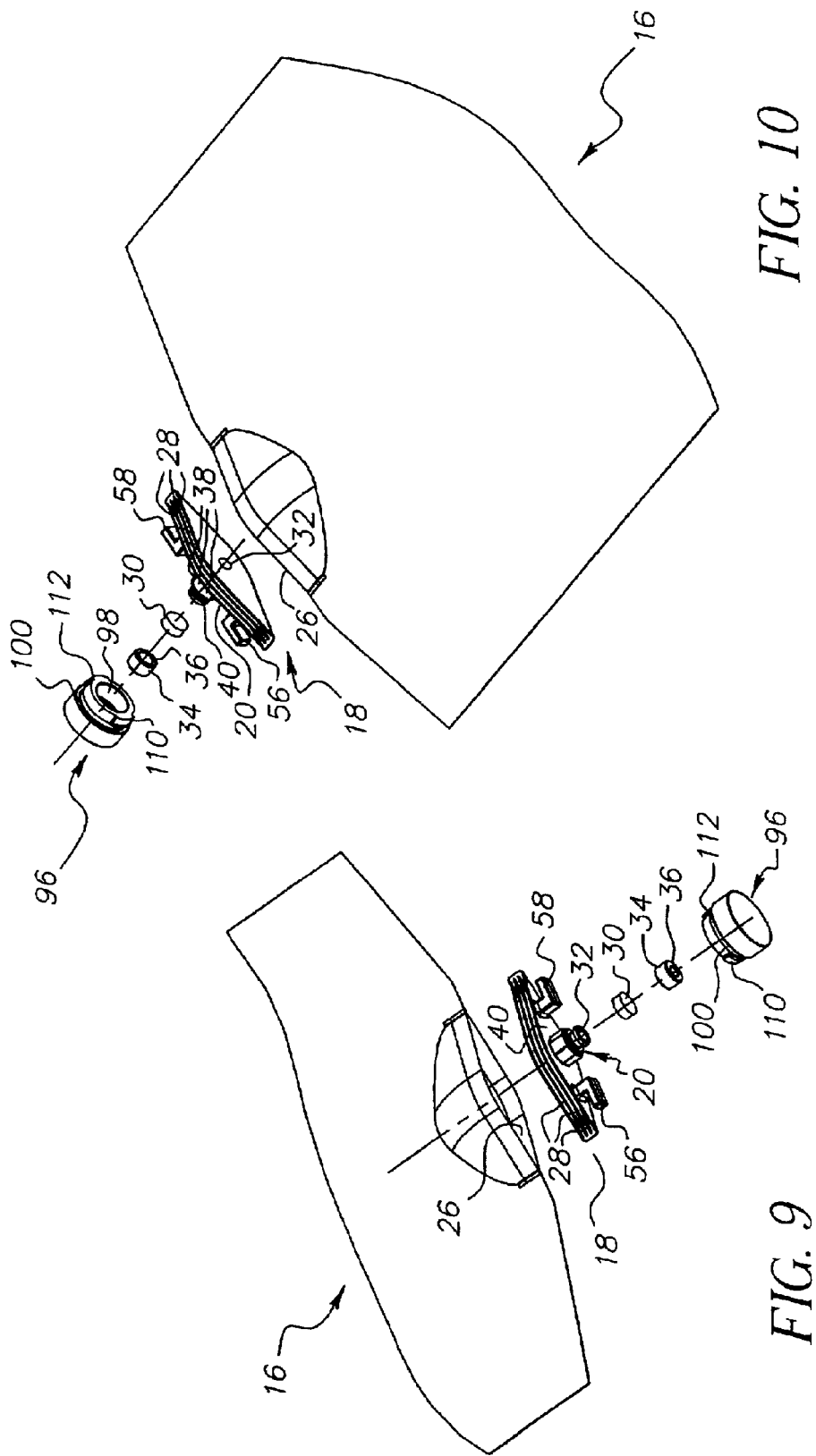

US 6,830,323 B2

RESTRICTING FLASH SPREAD WHEN WELDING HOUSING HALVES OF CARTRIDGE TOGETHER

CROSS REFERENCE TO RELATED APPLICATIONS

Reference is made to commonly assigned, copending application Ser. No. 09/931,523, entitled INK CARTRIDGE WITH COLOR DISCRIMINATION STRUCTURE and filed Aug. 16, 2001 in the names of Trafton, Newkirk, and Robinson; Ser. No. 09/931,420, entitled INK CARTRIDGE WITH ALIGNMENT FEATURES AND METHOD OF INSERTING CARTRIDGE INTO A PRINTER RECEPTACLE and filed Aug. 16, 2001 in the names of Trafton, Newkirk, Robinson, and Gotham; Ser. No. 09/931,521, entitled INK CARTRIDGE WITH MEMORY CHIP AND METHOD OF ASSEMBLING and filed Aug. 16, 2001 in the names of Trafton, Newkirk, and Robinson; and Ser. No. 09/931,313, entitled INK CARTRIDGE WITH INTERNAL INK BAG AND METHOD OF FILLING and filed Aug. 16, 2001 in the names of Trafton, Farnung, and Petranek.

Reference is also made to commonly assigned, copending application Ser. No. 10/198,511, entitled INK CARTRIDGE HAVING SHIELDED POCKET FOR MEMORY CHIP and filed Jul. 18, 2002 in the name of Petranek.

All of the cross-referenced applications are incorporated into this application.

FIELD OF THE INVENTION

The invention relates generally to cartridges such as for ink jet printers, and in particular to restricting flash spread which can occur when welding housing portions of the cartridge together. In this context, the term "flash" is a well known one, meaning the excess material that can spread from a weld.

BACKGROUND OF THE INVENTION

The cross-referenced applications filed Aug. 16, 2001 disclose an ink cartridge including a pair of housing halves that have an opening at a seam formed by respective abutting edges of the housing halves. A memory chip is supported within the opening to permit electrical contact to be made with the memory chip. A number of protuberances project from one of the housing portions and are welded to the other housing portion within respective cavities in the other housing portion. It is a concern that a flash formed when welding any one of the protuberances to the other housing portion might spread from the weld towards the seam including in the vicinity of the opening for the memory chip.

If the flash spreads too far, it might lodge between the edges of the housing halves that must abut to form the seam. This can interfere with abutment of the edges to form the seam.

Also, the flash may bulge outward from the seam in the vicinity of the opening for the memory chip, which could present an obstacle to making electrical contact with the memory chip.

These problems are believed to be solved by the invention.

SUMMARY OF THE INVENTION

According to one aspect of the invention, a cartridge comprising one housing portion having a protuberance adhered to another housing portion at a weld within a cavity in the other housing portion and which results in a flash being formed at the weld capable of spreading towards respective edges of the housing portions that abut to form a seam between the housing portions, is characterized in that:

the protuberance and the cavity are mutually dimensioned to restrict the flash substantially to within the cavity in order to prevent the flash from spreading between the edges of the housing portions, since if the flash was to spread between the edges it could interfere with their abutting to form the seam.

According to another aspect of the invention, a method of restricting spread of a flash from a weld formed when a pair of housing portions of a cartridge are welded together, comprises:

providing one of the housing portions with a protuberance that fits into a cavity in the other housing portion, but has an original length that is long enough to prevent edges of the housing portions from abutting to form a seam;

inserting the protuberance into the cavity;

melting a tip of the protuberance sufficiently by welding to reduce the length of the protuberance in order that the edges of the housing portions can abut to form the seam; and providing sufficient space in the cavity for the flash to spread from the weld without reaching the edges of the housing portions.

According to another aspect of the invention, a cartridge comprising a pair of housing portions having an opening at a seam between the housing portions, a memory chip accessible via the opening to permit electrical contact to be made with the memory chip, and a protuberance projecting from one of the housing portions and welded to the other housing portion within a cavity of the other housing portion and which results in a flash being formed at the weld that can spread towards the seam including in the vicinity of the opening, is characterized in that:

the protuberance and the cavity are mutually dimensioned to restrict the flash substantially to within the cavity in order to prevent the flash from bulging outward of the seam at least in the vicinity of the opening, since if the flash was to bulge outward of the seam in the vicinity of the opening it might present an obstacle to making electrical contact with the memory chip.

BRIEF DESCRIPTION OF THE DRAWINGS

FIGS. 2 and 3 are exploded perspective views of the egress snout and the collar as shown from opposite views.

FIGS. 9, 10 and 11 are views similar to FIGS. 2, 3 and 4, except that the cap is shown rather than the collar;

DETAILED DESCRIPTION OF THE INVENTION

Figure 1:
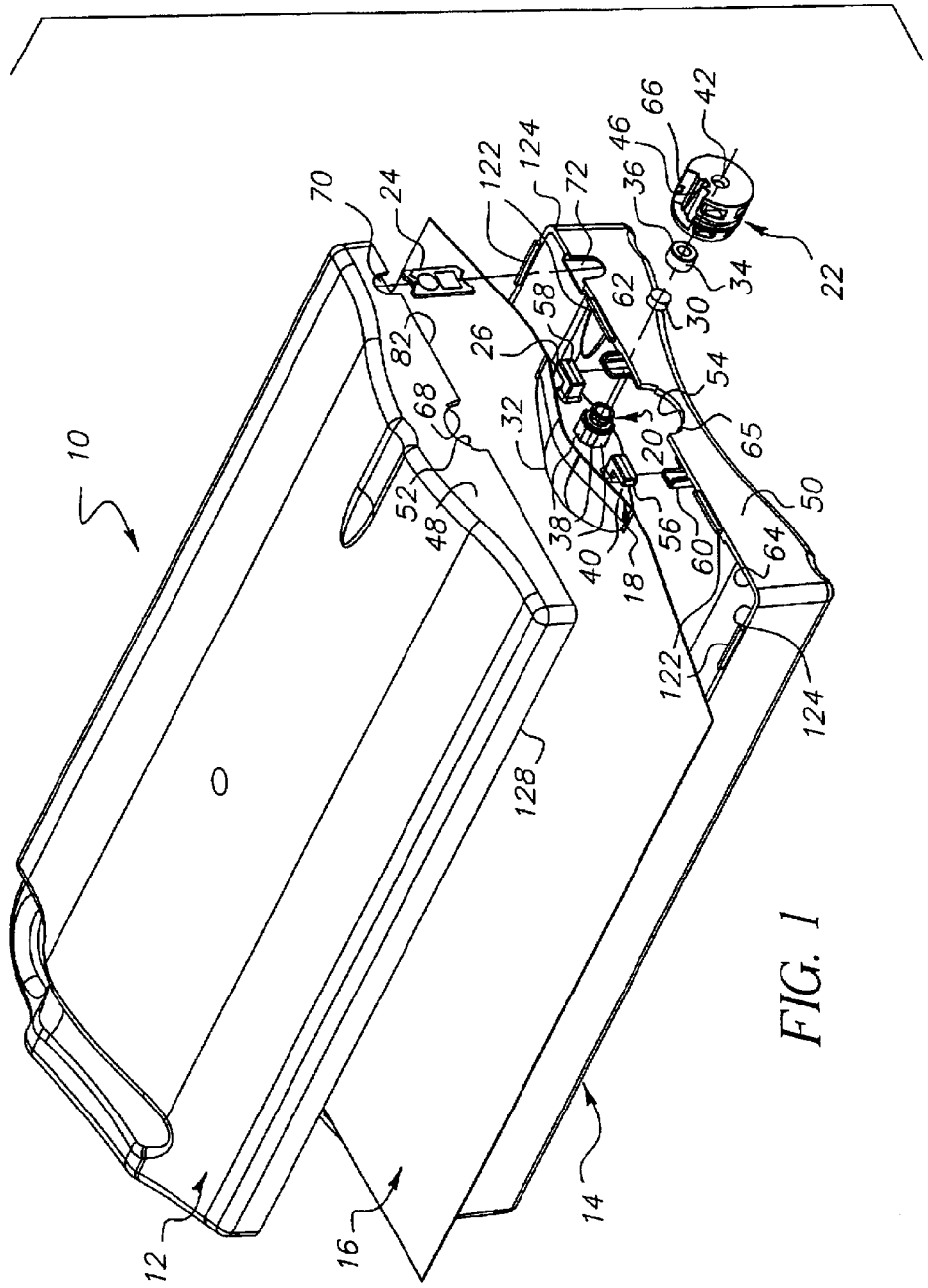
FIG. 1 is an exploded perspective view of an ink cartridge including a pair of housing halves, a fitting including an egress snout for discharging an ink supply from a bag or alternatively for discharging a cleaner supply from the bag, and a collar that mates with the snout in any one of a number of allowable orientations to provide an identification of the ink supply.

Referring now to the drawings, FIGS. 1–16 show an alternative ink/cleaner cartridge 10 for an ink jet printer (not shown).

The cartridge 10 when used as an ink cartridge includes the following components:

- a pair of plastic housing halves 12 and 14 that are connected together to form a cartridge housing;
- a disposable flexible ink supply bag 16;
- a plastic connector-fitting or fitment 18 having an integral ink egress snout 20 for discharging an ink supply from the bag 16;
- a plastic single-part collar 22 for the snout 20, which functions as an ink identifier to identify the ink supply in the bag 16 such as by color or type; and
- a memory chip 24.

As shown in FIGS. 2 and 3, the fitting 18 is attached via a thermal seal to the bag 16, within an elongate opening 26 in the bag. During the thermal seal of the bag 16 to the fitting 18, a small amount of melted material from the bag flows to between parallel ribs 28 along opposite longitudinal sides of the fitting 18 to provide an essentially leak-proof seal between the bag and the fitting. A rubber septum 30 is tightly inserted into an ink egress opening 32 in the snout 20 to plug the opening. Then, an aluminum or stainless steel cap 34 is press-fitted on the snout 20. The cap 34 partially overlaps the septum 30 to capture the septum, and has a center opening 36 which allows a hollow needle (not shown) to pierce the septum in order to discharge an ink supply from the bag 16 when the cartridge 10 is used in an ink jet printer.

Collar 22 And Snout 20

The snout 20 has eight identical outer peripheral surfaces (sides) or facets 38 that project perpendicular from a longitudinal planar face 40 of the fitting 18 to form an octagon. See FIGS. 2 and 3. In a similar sense, the collar 22 has a center opening 42 that is circumscribed by eight identical inner peripheral surfaces (sides) or facets 44 that form an octagon. This mutual or complementary configuration allows the snout 20 to be received in the center opening 42 only when the collar 22 is in any one of eight allowable angular orientations 0° or 360°, 45°, 90°, 135°, 180°, 225°, 270°, and 315°. Preferably, the eight surfaces 44 of the collar 22 are aligned with the eight surfaces 38 of the snout 20 to position the collar relative to the snout in a selected one of the eight orientations. Then, the collar 22 is mated with the snout 20 in the selected orientation. Respective contact between the eight surfaces 38 and the eight surfaces 44 prevents the collar 22 from being rotated about the snout 22 and thus serves to fix the collar in the selected orientation. The selected orientation provides a visible indication that serves to identify the ink supply in the bag 16 such as by color or type.

As described in the cross-referenced applications filed Aug. 16, 2001 and incorporated into this application, the collar 22 has a key slot or keyway 46 that is angular positioned in accordance with the selected orientation of the collar. The hollow needle (not shown) for piercing the septum 30 in order to discharge an ink supply from the bag 16 when the cartridge 10 is used in an ink jet printer, is mounted on a key assembly (not shown) having a key tab intended to be received in the key slot 46. The particular orientation of the key assembly must match the selected orientation of the collar 22 in order for the key tab to be received in the key slot 46.

The number of the surfaces 38 of the snout 20 and the number of the surfaces 44 of the collar 22, need not each be eight (although they must be the same number). Preferably, the number of the surfaces 38 of the snout 20 and the number of the surfaces 44 of the collar 22 fall within the range 4–12. All that is necessary is that the number of the surfaces 38 of the snout 20 and the number of the surfaces 44 of the collar 22 form similar complementary polygons that permit the collar 22 to mate with the snout 20.

L-Shaped Engageable-Disengageable Members 56, 58, 60, 62

Figure 4:
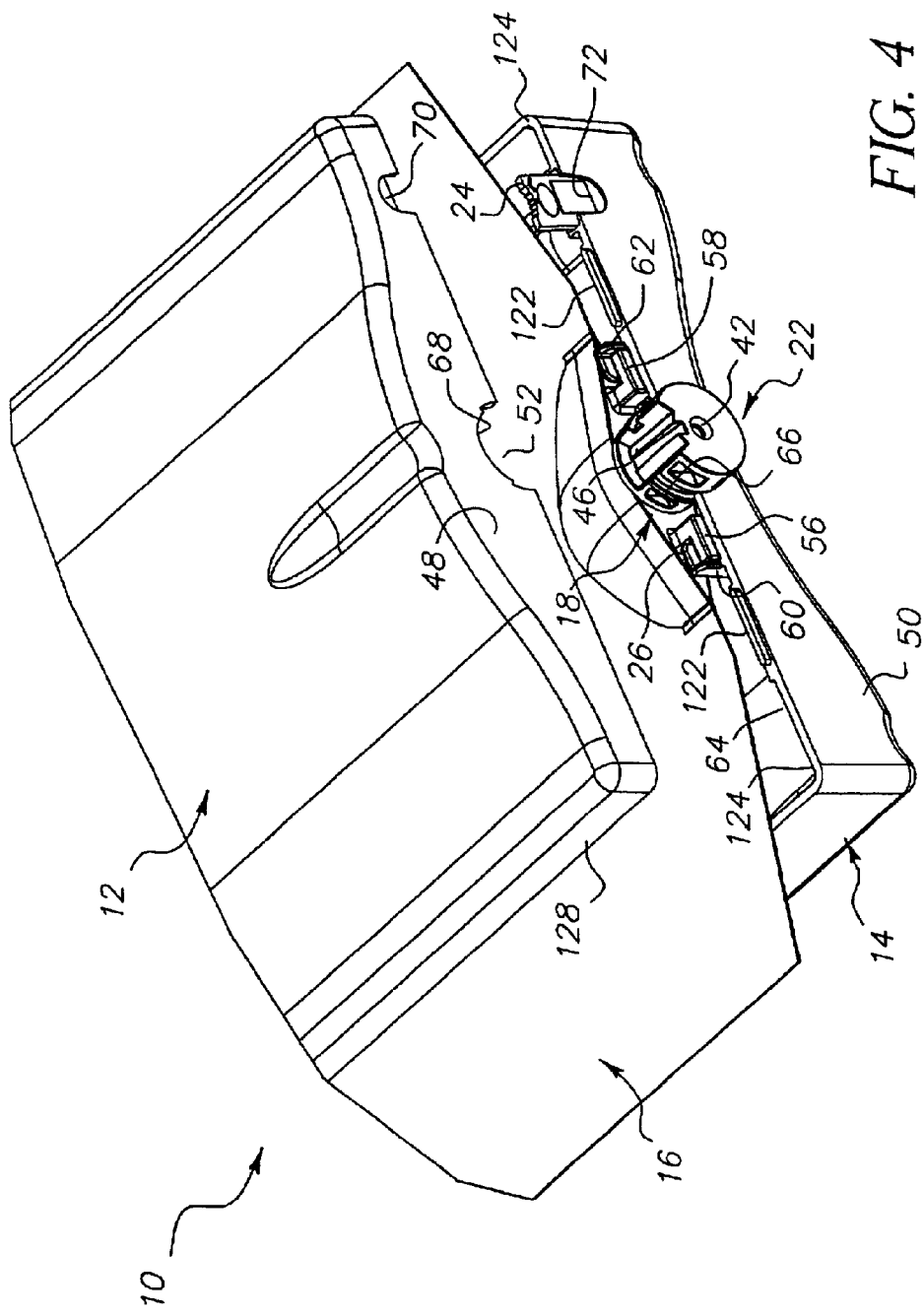
FIG. 4 is view similar to FIG. 1, but showing the cartridge partially assembled.
Figure 6:
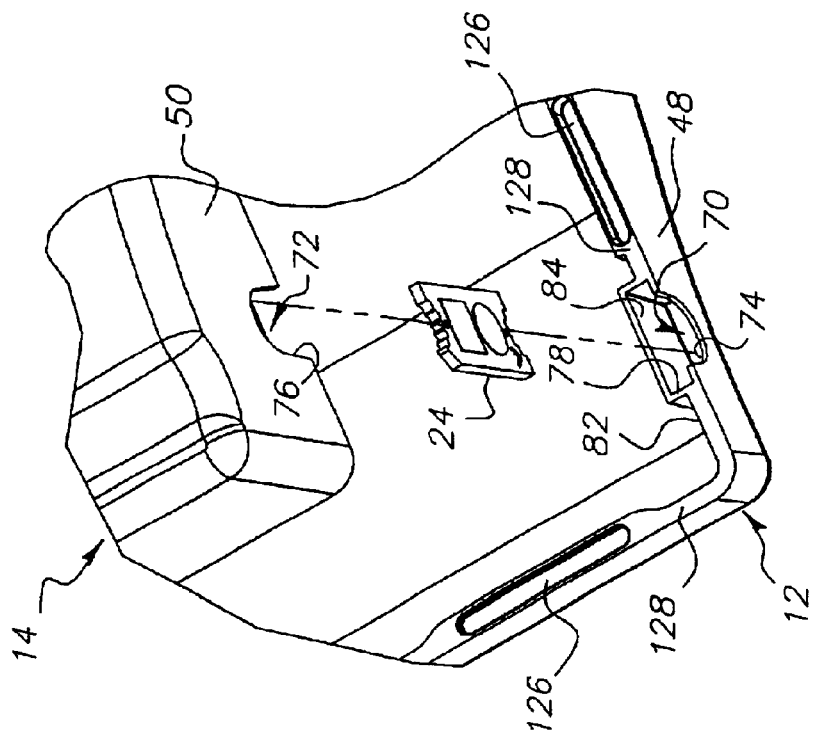
FIGS. 5 and 6 are exploded perspective views of a memory chip shown being inserted into a pocket in the housing halves.
Figure 5:
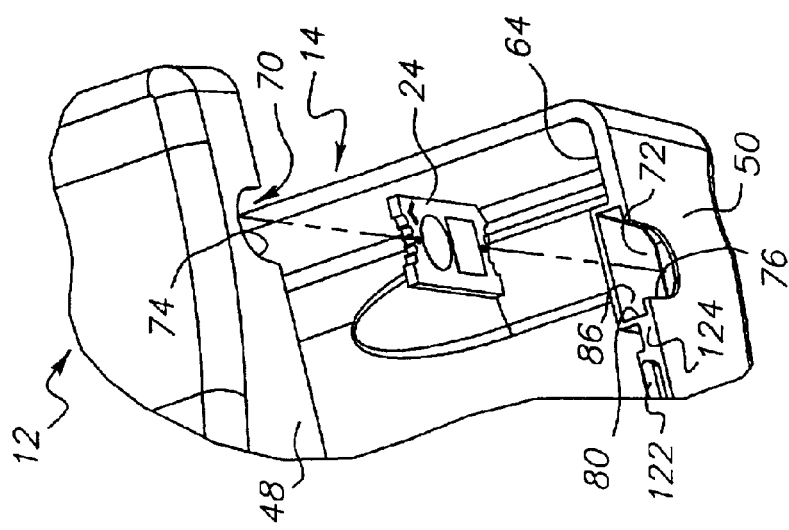

The housing halves 12 and 14 at respective bottom wall portions 48 and 50 have opening halves 52 and 54 that form a single bottom opening when the housing halves are connected together. See FIGS. 1 and 4. The fitting 18 has a pair of L-shaped engageable-disenageable members or tabs 56 and 58 that project from respective areas of the face 40 (of the fitting) which are spaced from the snout 20. In a similar sense, a pair of L-shaped engageable-disengageable members or tabs 60 and 62 project from an inner side 64 of the wall portion 50 and are spaced from the opening half 52. The L-shaped engageable-disengageable members 56 and 58 extend in opposite directions as do the L-shaped engageable-disengageable members 60 and 62. This complementary arrangement or mutual configuration permits the L-shaped member 56 to engage the L-shaped member 60 and the L-shaped member 58 to engage the L-shaped member 62 when the bag 16 is placed on the housing half 14. The bag 16 is thus secured in place. At the same time as shown in FIG. 4 an edge 65 of the opening half 54 is received in an outer peripheral groove 66 in the collar 22 to support the collar. Then, when the housing half 12 is connected to the housing half 14, an edge 68 of the opening half 52 is received in the groove 66.

When the bag 16 is emptied, it is possible to remove the bag (with the fitting 18) from the cartridge 10. If the housing half 12 is disconnected from the housing half 14, the L-shaped engageable-disengageable members 56 and 58 are disengaged from the L-shaped engageable-disengageable members 60 and 62. Also, the collar 22 can be removed from the snout 20.

Other L-shaped engageable-disengageable members can be provided on the fitting 18 and the housing half 14 in addition to the L-shaped engageable-disengageable members 56 and 58 and the L-shaped engageable-disengageable members 60 and 62. Also, it is not necessary that these engageable-disengageable members be L-shaped. A number of known engagements or interlocks can be used instead, such as pins in holes, etc.

Pocket For Memory Chip 24

As shown in FIGS. 1 and 4–6, the housing halves 12 and 14 at bottom wall portions 48 and 50 have respective pocket portions 70 and 72 which include slightly smaller and larger wall opening portions 74 and 76 and sleeve or channel portions 78 and 80. Moreover, the bottom wall portion 48 at an inner side 82 and the bottom wall portion 50 at the inner side 64 have respective ink blocking shield segments 84 and 86 that project inwardly of the housing halves 12 and 14 from the inner sides. See FIGS. 5 and 6. The ink blocking shield segment 84 is an integral extension of the inner side 82 and extends across the wall opening portion 74, and the ink blocking shield segment 86 is an integral extension of the inner side 64 and extends across the wall opening portion 76. This is to isolate or seal the wall opening portions 74 and 76 from the interiors of the housing halves 12 and 14. The wall opening portions 74 and 76 are necessary to permit electrical contact to be made with the memory chip 24 when the cartridge 10 is used in an ink jet printer.

When the housing halves 12 and 14 are connected together, the memory chip 24 is peripheral-edge supported in the channel portions 78 and 80 to hold the memory chip in the wall opening portions 74 and 76. Also, the pocket portions 70 and 72 combine to form a single pocket including the wall opening portions 74 and 76 combining to form a single wall opening, and the ink blocking shield segments 84 and 86 abut end-to-end to seal the single wall opening. The ink supply bag 16, which is between the housing halves 12 and 14, might per chance leak ink. However, the ink blocking shield segments 84 and 86 which are then abutted end-to-end prevent any ink from entering the wall opening portions 74 and 76 and contaminating the memory chip 24.

Optional Stakes For Fitting 18

Figure 7:
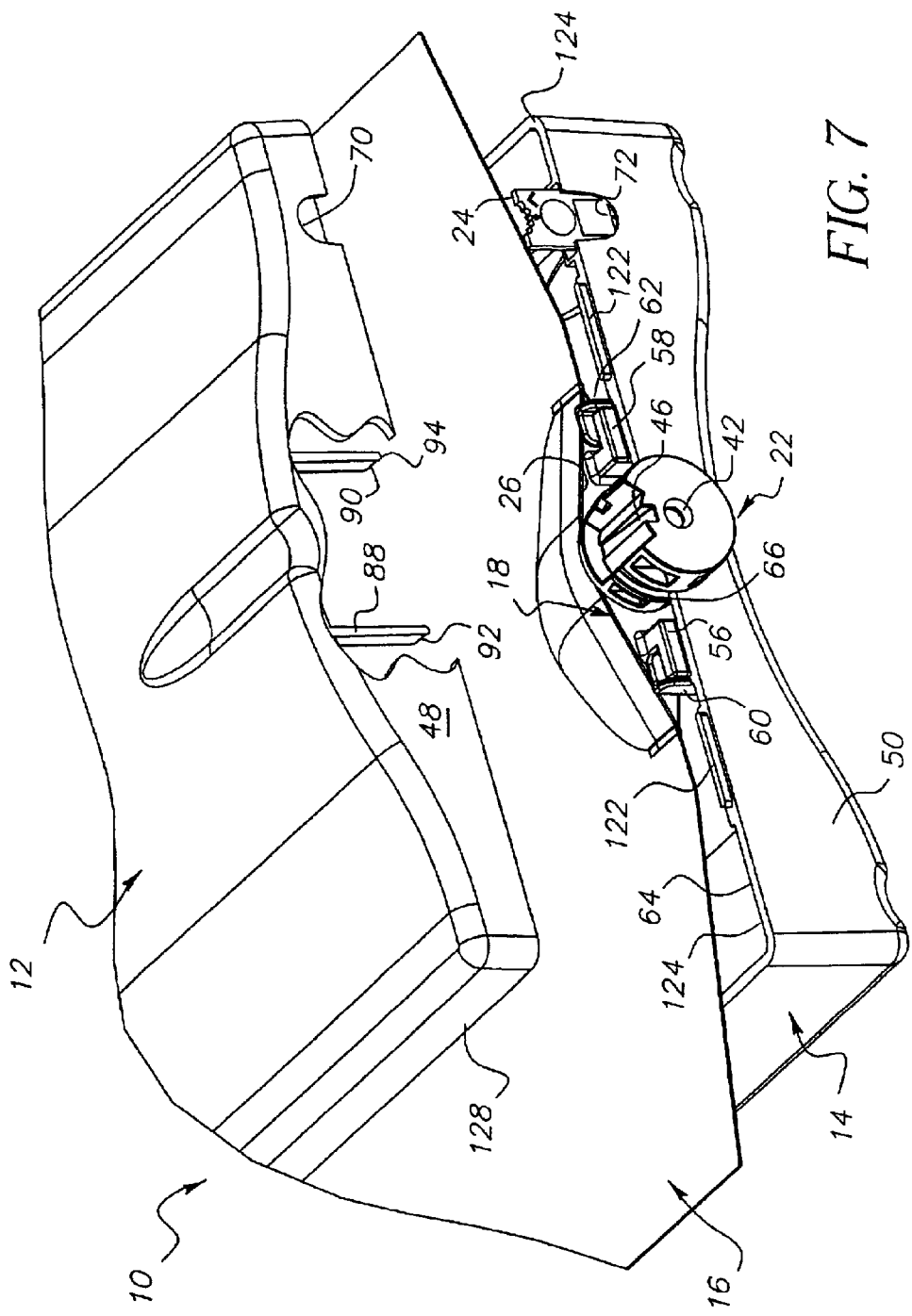
FIG. 7 is a view similar to FIG. 4, but showing one of the housing halves partially cut away to reveal stakes that are adhered to the fitting.

As shown in FIG. 7, the housing half 12 has at least two interior stakes 88 and 90 that project from the housing half and are parallel to the bottom wall portion 48 of the housing half. When the housing halves 12 and 14 connected together, respective tips 92 and 94 of the stakes 88 and 90 are melted preferably onto the L-shaped engageable-disengageable members 56 and 58 of the fitting 18 to adhere the stakes to those L-shaped members. The stakes 88 and 90 thus hold the L-shaped engageable-disengageable members 56 and 58 of the fitting 18 fast to the housing half 12, and can be separated from those L-shaped members only by breaking the connection at the melted tips 92 and 94 (or by breaking the stakes and/or the L-shaped members). This positively ensures that the fitting 18 cannot shift, however slightly, when the L-shaped engageable-disengageable member 56 is engaged with the L-shaped engageable-disengageable member 60 and the L-shaped engageable-disengageable member 58 is engaged with the L-shaped engageable-disengageable member 62 as shown in FIGS. 4 and 7. Also, the fitting 18 cannot be removed from the housing half 12 without forcibly separating the stakes 88 and 90 from the L-shaped engageable-disengageable members 56 and 58.

Alternatively, the tips 92 and 94 of the stakes 88 and 90 can be melted onto the L-shaped engageable members 60 and 62 of the housing half 14 to hold those L-shaped members fast to the housing half 12.

Alternatively, the tips 92 and 94 of the stakes 88 and 90 can be melted onto both the L-shaped engageable members 56 and 58 of the fitting 18 and the L-shaped engageable members 60 and 62 of the housing half 14.

The tips 92 and 94 of the stakes 88 and 90 can be melted onto the L-shaped engageable members 56 and 58 of the fitting 18 and/or the L-shaped engageable members 60 and 62 of the housing half 14 via a conventional vibration weld that melts the tips.

Cap 96

FIGS. 8–12 show the cartridge 10 when used as a cleaner cartridge instead of an ink cartridge. In this instance, the bag 16 is a cleaner supply bag instead of an ink supply bag, and a cap 96 is mated with the snout 20 in place of the collar 22. The cap 96 must be removed from the snout 20 to allow a hollow needle (not shown) to pierce the septum 30 in order to discharge a cleaner material, e.g. a known cleaner solution, from the bag 16. The cleaner material is intended to be applied in an ink jet printer instead of an ink supply, to clean the ink jet printer of any ink residue.

The cap 96 has the same diameter as the collar 22 and, like the center opening 42 in the collar, it has a center opening 98 for receiving the snout 20. See FIGS. 3 and 10. Also, like the outer peripheral groove 66 in the collar 22, the cap 96 has an outer peripheral groove 100 for receiving the edge 65 of the opening half 54 in the bottom wall portion 50 of the housing half 14 and for receiving the edge 68 of the opening half 52 in the bottom wall portion 48 of the housing half 12. See FIGS. 1, 4 and 8, 11.

Figure 8:
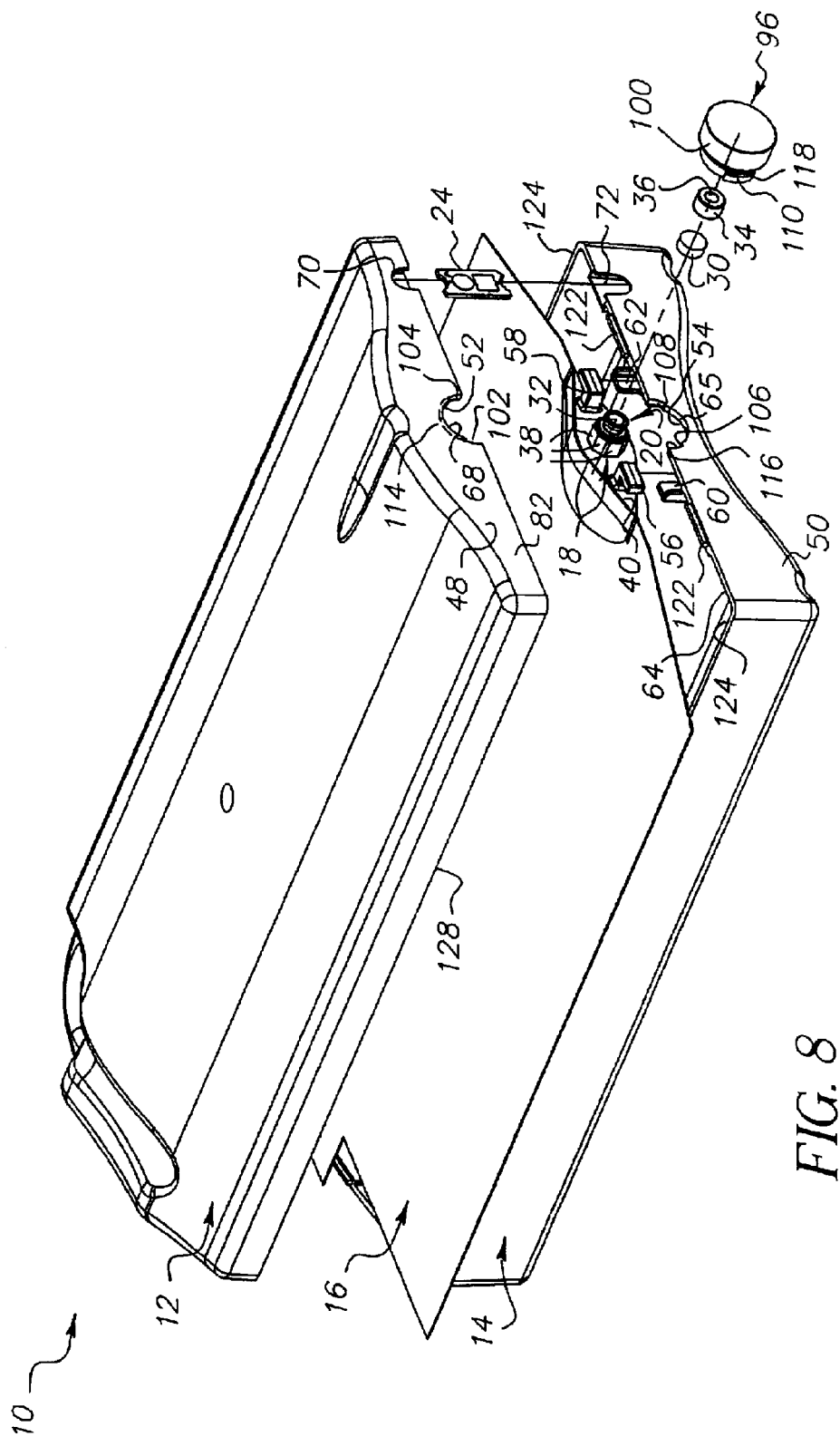
FIG. 8 is a view similar to FIG. 1, except that a cap is mated with the snout in place of the collar when the cleaner supply rather than the ink supply is stored in the bag.
Figure 11:
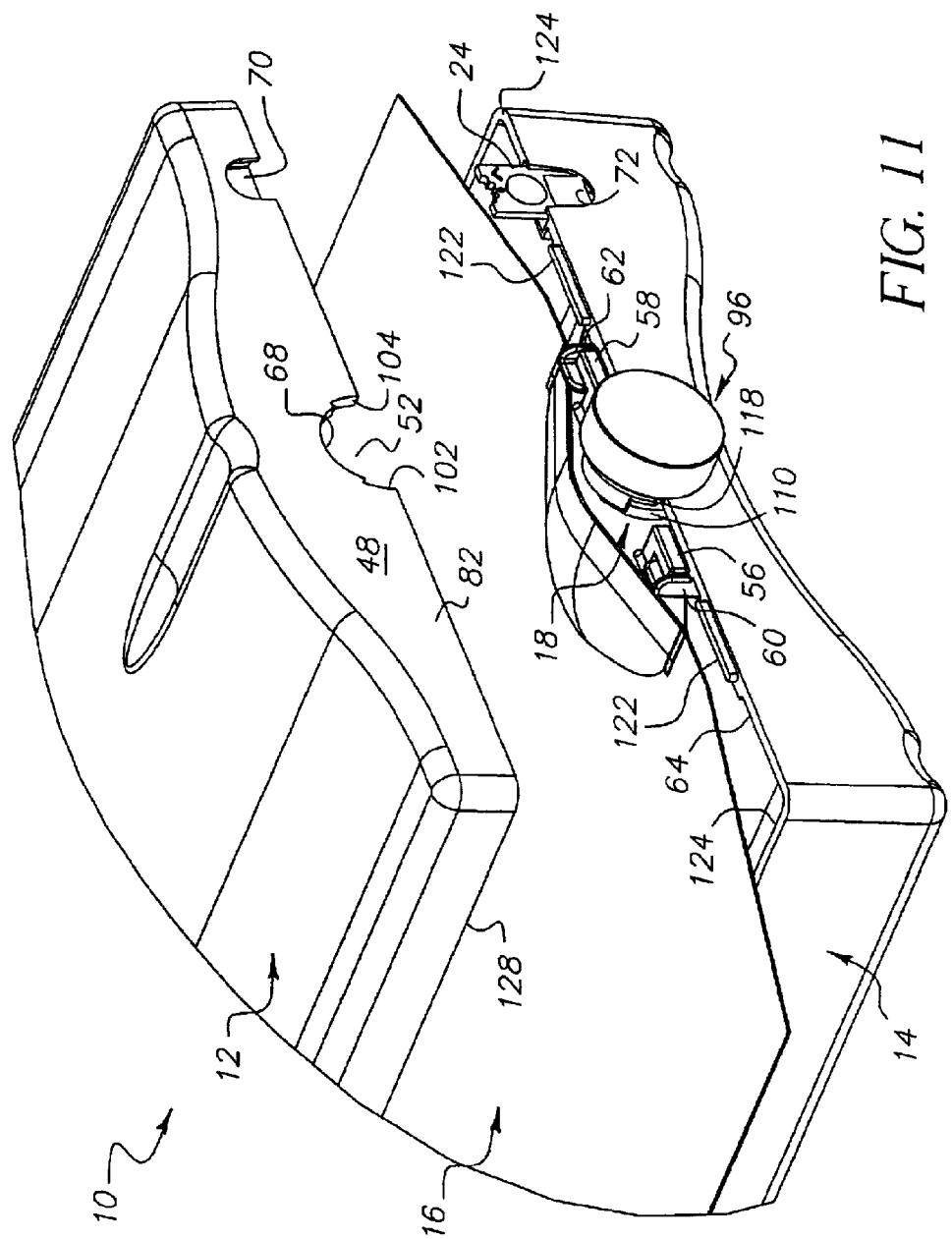

As shown in FIG. 8, the bottom wall portion 48 of the housing half 12 has a pair of clearance recesses 102 and 104 at the edge 68 of the opening half 52, and the bottom wall portion 50 of the housing half 14 has a pair of clearance recesses 106 and 108 at the edge 65 of the opening half 54. The four clearance recesses 102, 104, 106 and 108 permit a pair of lugs 110 and 112 on the cap 96 to be admitted through the opening halves 52 and 54. Then, when the cap 96 is rotated on the snout 20, the lugs 110 and 112 engage with the bottom wall portions 48 and 50 at their inner sides 82 and 64.

Figure 12:
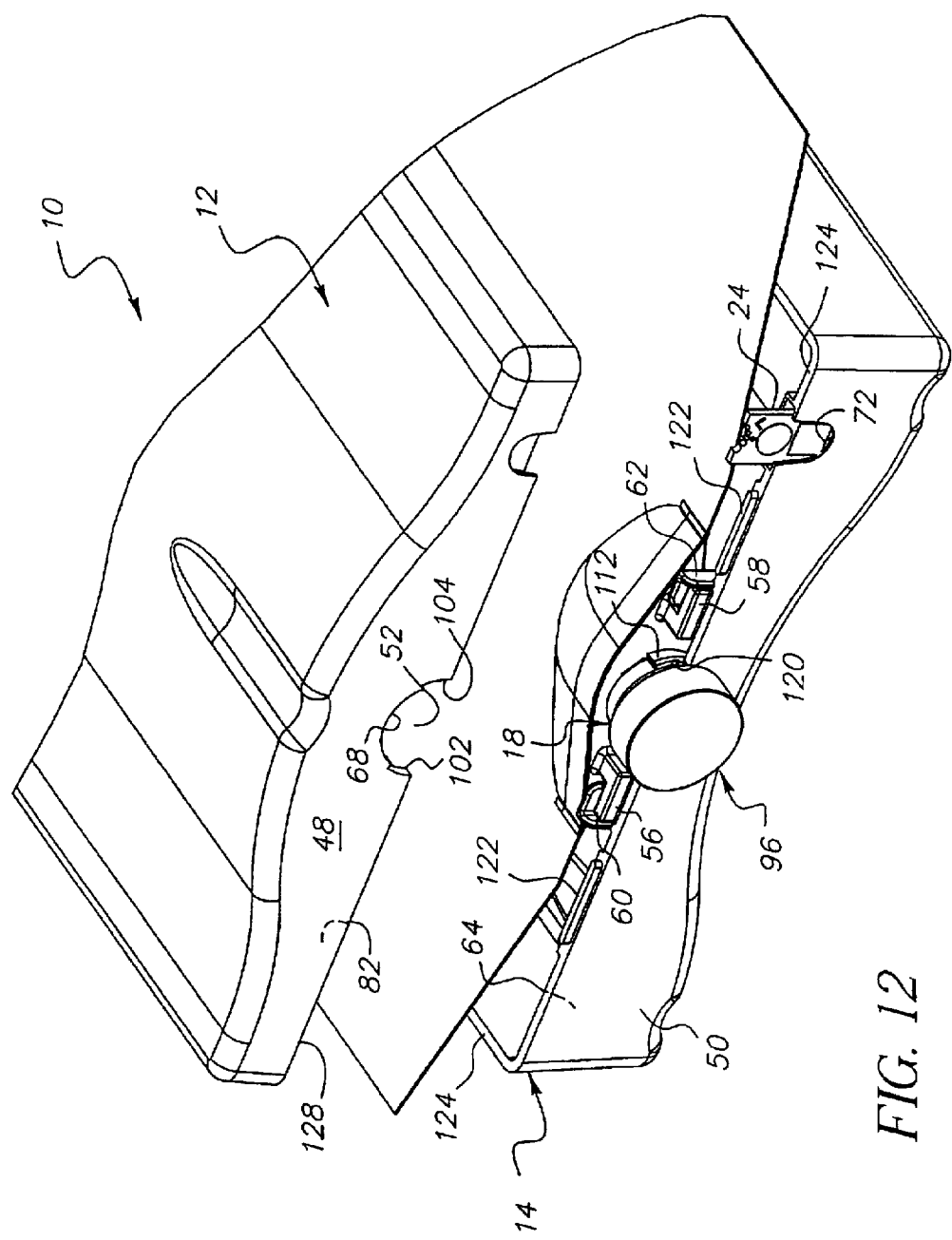
FIG. 12 is a view similar to FIG. 11, but as shown from an opposite view.
Figure 13:
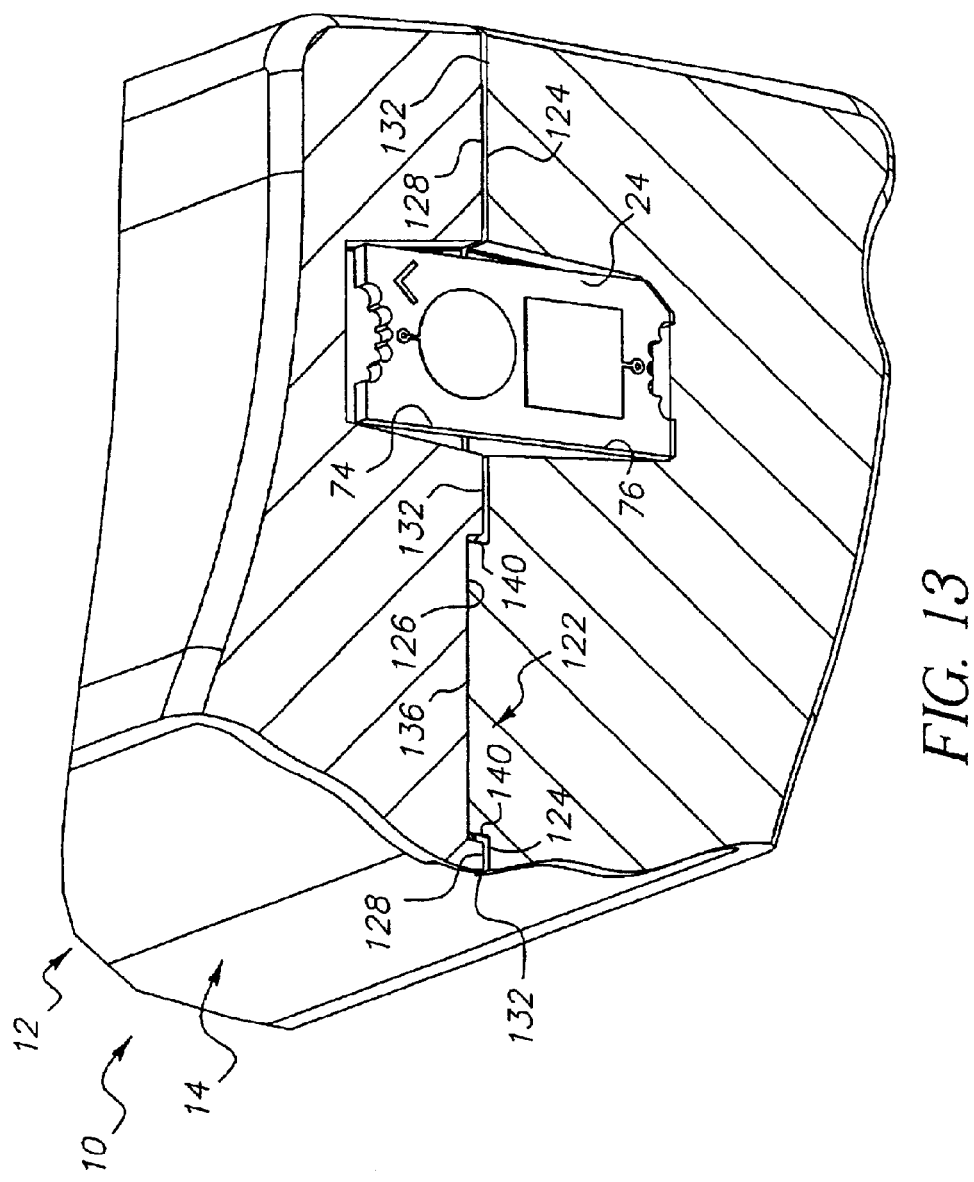
FIG. 13 is a section view of the housing halves, showing how protuberances on one of the housing halves are received within respective cavities in the other housing half in order to be welded to the other housing half.

As shown in FIGS. 8 and 12, the inner side 82 of the bottom wall portion 48 has a cavity 114 adjacent the edge 68 of the opening half 52, and the inner side 64 of the bottom wall portion 50 has a cavity 116 adjacent the edge 65 of the opening half 54. The cavities 114 and 116 receive respective protuberances or bumps 118 and 120 adjacent the lugs 110 and 112 on the cap 96 when the cap is rotated on the snout 20 (with the lugs against the inner sides 82 and 64 of the bottom wall portions 48 and 50). The protuberances 118 and 120 in combination with the cavities 114 and 116 serve to prevent unintended rotation of the cap 96.

Connecting Housing Halves 12 and 14 Together

As shown in FIGS. 1, 5, 6 and 13–15, a number of identical protuberances or tabs 122 project from an edge 124 along the housing half 14 and are to be received in respective cavities 126 in an edge 128 along the housing half 12.

Figure 15:
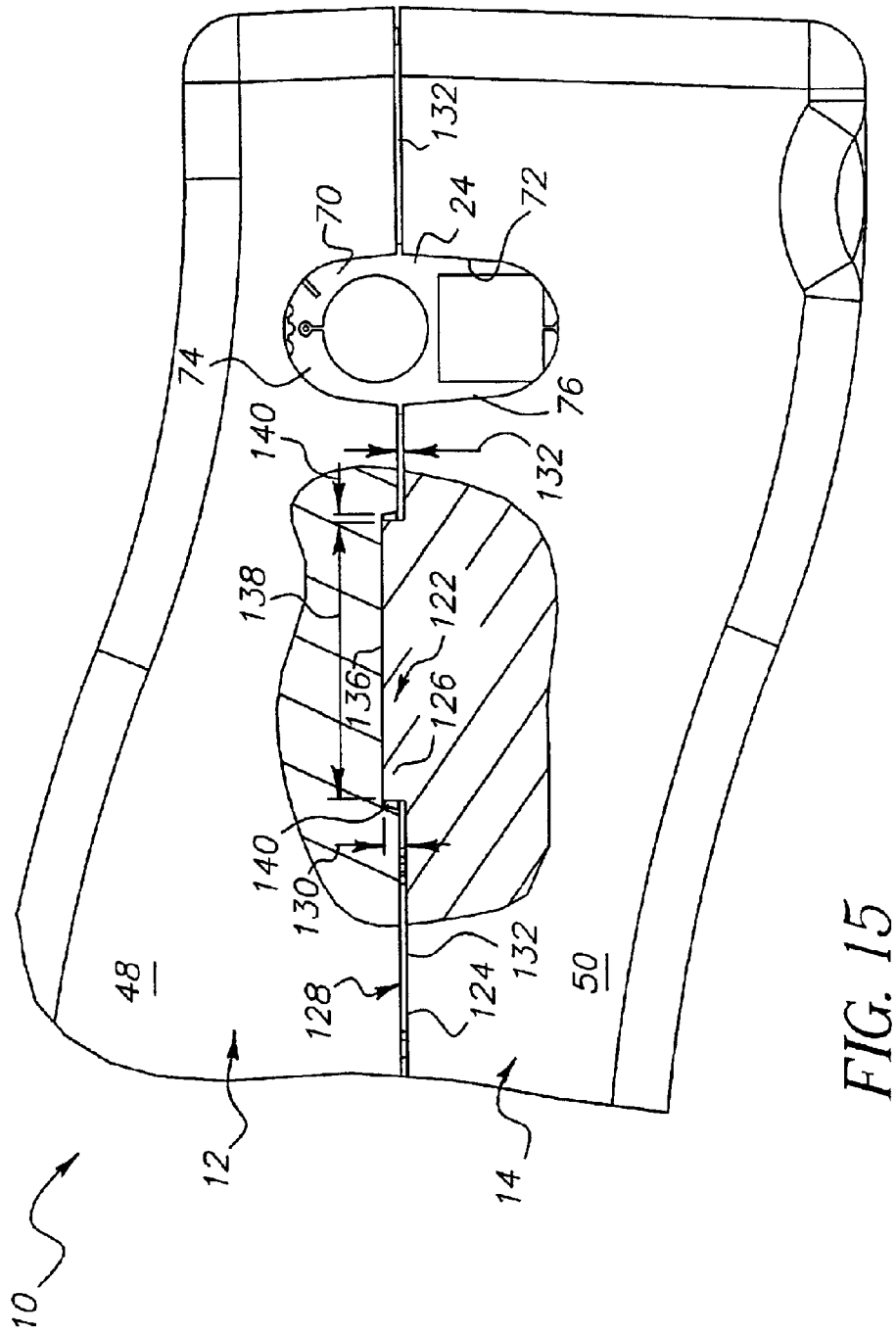
FIG. 15 is section view similar to FIG. 13, showing arrows to indicate various dimensions.
Figure 16:
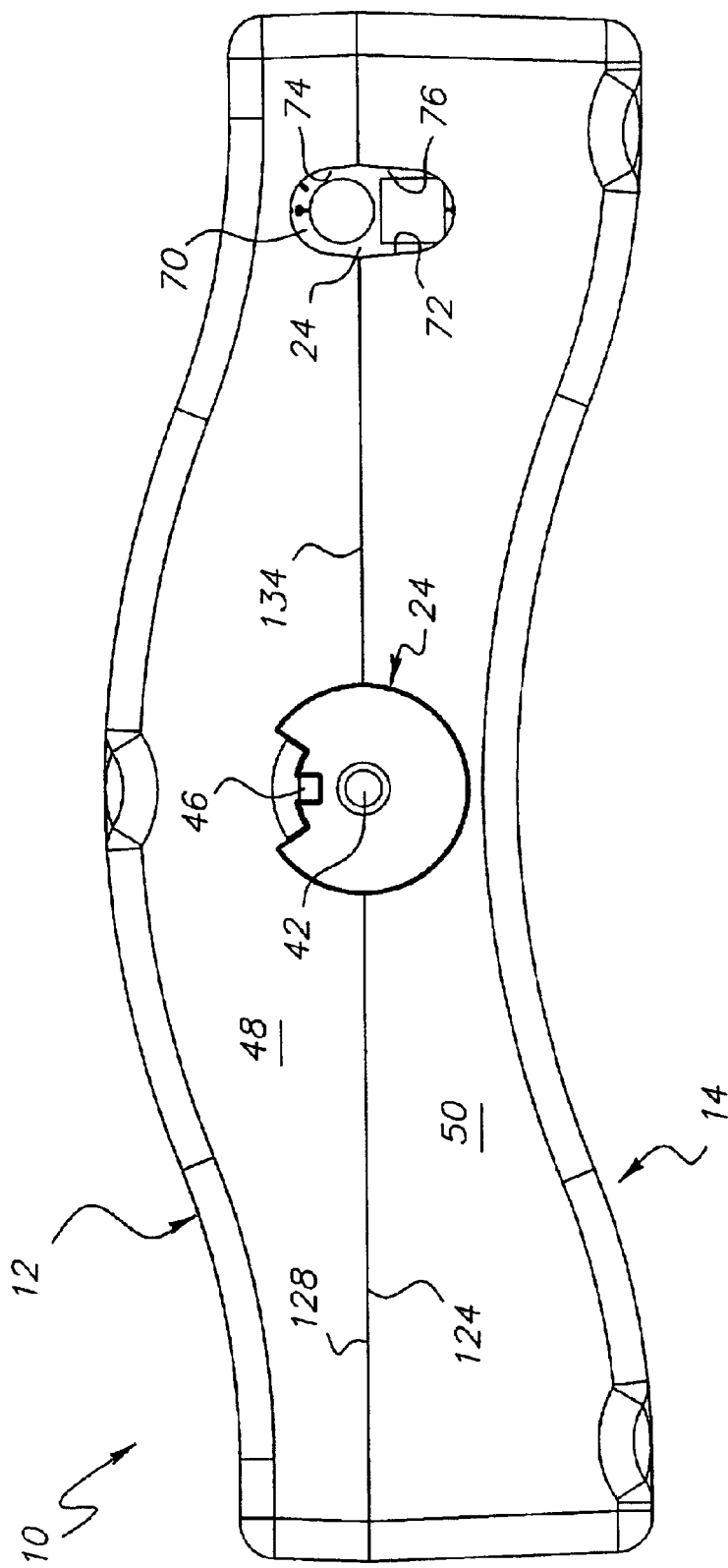
FIG. 16 is an end view of the housing halves connected together.

The protuberances 122 each have an original length 130 in FIG. 15, preferably about 1.38 mm, that is about 0.38 mm greater than the depth of each cavity 126 (the depth of each cavity is about 1.00 mm). Consequently, when the protuberances 122 are received in the cavities 126, the edges 124 and 128 of the housing halves 14 and 12 are separated by a space or gap 132 in FIG. 15 which is about 0.38 mm. This prevents the edges 124 and 128 from abutting to form a seam 134 between the housing halves 14 and 12.

Figure 14:
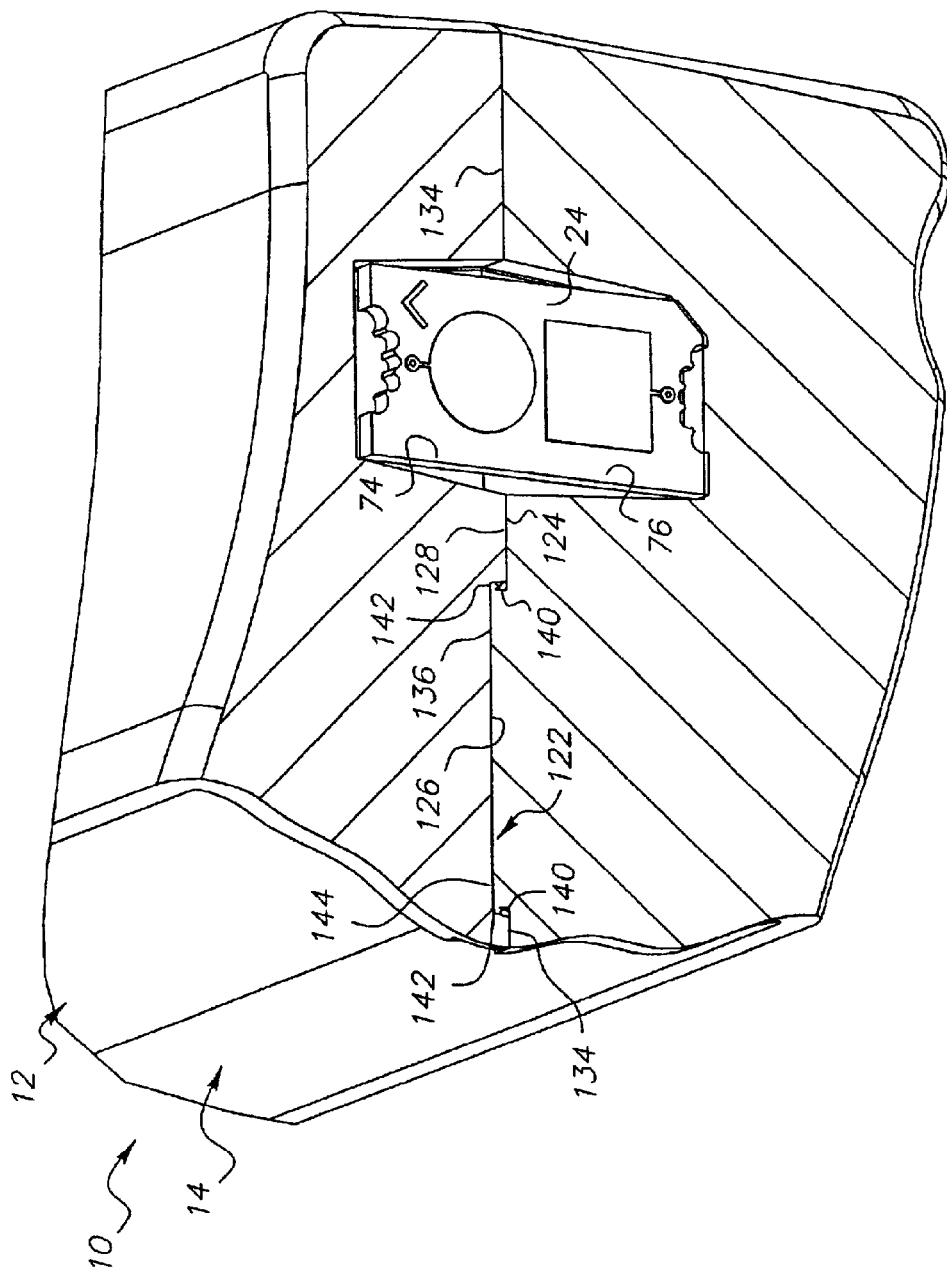
FIG. 14 is a section view of the housing halves, showing a protuberance welded to the other housing half.

To connect the housing halves 12 and 14 together, the protuberances 122 are welded at their tips 136 (within the cavities 126) to the housing half 12, preferably by a known vibration welding process, as shown in FIG. 14. The heat generated by the welding melts the tips 136 to reduce the length 130 of the protuberances 122 from about 1.38 mm to about 1.00 mm, i.e. about 0.38 mm. This eliminates the spaces 132, which permits the edges 124 and 128 to abut to form the seam 134 between the housing halves 14 and 12. See FIGS. 14 and 16.

As shown in FIG. 15, each protuberance 122 has a width 138, preferably about 16.98 mm. Clearances spaces 140 of at least 0.33 mm exist between each side of a protuberance 122 and respective sides of a cavity 126. Thus, the width of a cavity 126 is at least 17.31 mm.

When the protuberances 122 are welded at their tips 136 (within the cavities 126) to the housing half 12, a flash 142 is formed at respective welds 144 between the tips and the housing half 12. The flash 142 spreads from each weld 144 into the clearances spaces 140. As shown in FIG. 14, the flash 142 only partially fills the clearance spaces 140. Thus, the protuberance 122 and the cavities 126 are mutually dimensioned to restrict the flash 142 substantially to within the cavities. This prevents the flash 142 from spreading between the edges 124 and 128 of the housing halves 14 and 12, since if the flash was to spread between the edges it could interfere with their abutting to form the seam 134. Also, it prevents the flash 142 from bulging outward from the seam 134 including in the vicinity of the wall opening portions 74 and 76 (that combine to form a single wall opening for permitting electrical contact to be made with the memory chip 24), since if the flash was to bulge outward of the seam in the vicinity of the wall opening portions it might present an obstacle to making electrical contact with the memory chip.

The invention has been described in detail with particular reference to certain preferred embodiments thereof, but it will be understood that variations and modifications can be effected within the spirit and scope of the invention.

Parts List 10. ink cartridge
12. housing half
14. housing half
16. ink bag
18. connector-fitting
20. snout
22. collar
24. memory chip
26. elongate opening
28. ribs
30. septum
32. ink egress opening
34. cap
36. center opening
38. eight surfaces or facets
40. face
42. center opening
44. eight surfaces or facets
46. key slot
48. bottom wall portion
50. bottom wall portion
52. opening half
54. opening half
56. L-shaped engageable member
58. L-shaped engageable member
60. L-shaped engageable member
62. L-shaped engageable member
64. inner side
65. edge
66. groove
68. edge
70. pocket portion
72. pocket portion
74. wall opening portion
76. wall opening portion
78. sleeve or channel portion
80. sleeve or channel portion
82. inner side
84. ink blocking shield segment
86. ink blocking shield segment
88. stake
90. stake
92. tip
94. tip
96. cap
98. center opening
100. groove
102. clearance recess
104. clearance recess
106. clearance recess
108. clearance recess
110. lug
112. lug
114. cavity
116. cavity
118. protuberance
120. protuberance
122. protuberance
124. edge
126. cavity
128. edge
130. length
132. space
134. seam
136. tip
138. width
140. clearance space
142. flash
144. weld

What is claimed is:

1. A cartridge comprising a pair of housing portions having an opening at a seam between said housing portions, a memory chip accessible via said opening to permit electrical contact to be made with said memory chip, and a protuberance projecting from one of said housing portions and welded to the other housing portion within a cavity of the other housing portion and which results in a flash being formed at the weld that can spread towards said seam including in the vicinity of said opening, is characterized in that:

said protuberance and said cavity are mutually dimensioned to restrict the flash substantially to within said cavity in order to prevent said flash from bulging outward of said seam at least in the vicinity of said opening, since if said flash was to bulge outward of said seam in the vicinity of said opening it might present an obstacle to making electrical contact with said memory chip.

2. A cartridge as recited in claim 1, wherein said housing portions have respective edges that abut to form said seam, and said protuberance has an original length that is long enough to prevent said edges from abutting when said protuberance is received in said cavity and which is reduced via welding to permit said edges to abut to form said seam.

3. A cartridge as recited in claim 2, wherein the original length of said protuberance is reduced via welding about 0.38 mm.

4. A cartridge as recited in claim 3, wherein said cavity has a depth of about 1.00 mm, and the original length of said protuberance is about 1.38 mm to separate said edges of the housing portions about 0.38 mm when said protuberance is received in said cavity.

5. A cartridge as recited in claim 1, wherein a clearance space of at least 0.33 mm exists between each side of said protuberance and respective sides of said cavity to provide room for the flash to spread without reaching said seam.

6. A method of restricting spread of a flash from a weld formed when a pair of housing portions of a cartridge are welded together, comprising:

providing a pair of housing portions having an opening at a seam between the housing portions, a memory chip accessible via the opening to permit electrical contact to be made with the memory chip, and a protuberance projecting from one of the housing portions and to be welded to the other housing portion within a cavity of the other housing portion;

inserting the protuberance into the cavity;

welding the protuberance to the other housing portion; and providing sufficient space in the cavity for the flash to spread from the weld without bulging outward of the seam at least in the vicinity of the opening, since if the flash was to bulge outward of the seam in the vicinity of the opening it might present an obstacle to making electrical contact with the memory chip.

7. A cartridge comprising:

a first housing portion abutting a second housing portion forming a seam therebetween;

a pocket formed in the abutting first and second housing portions, the pocket extending across the seam;

a memory chip residing in the pocket;

an openingin the abutting housing portions adjacent the pocket thereby allowing electrical contact to be made with the memory chip residing in the pocket; and a protuberance projecting from an edge of the first housing portion; and a cavity formed in an edge of the second housing portion, the protuberance residing in the cavity, the cavity containing a flash formed by welding the protuberance within the cavity thereby preventing the flash from entering the opening and blocking electrical contact with the memory chip residing in the pocket.

8. A cartridge as recited in claim 7 wherein:

the protuberance projects a first distance from the edge of the first housing and the cavity extends to a depth of a second distance into the edge of the second cavity, the first distance being greater than the second distance prior to welding the protuberance within the cavity such that there is a gap between the edges of the first and second housing portions when the protuberance is inserted into the cavity, the first and second housing portions moving into an abutting position after welding.

9. A cartridge as recited in claim 8 wherein:

the first distance is reduced as a result of welding to about 0.38 mm.

10. A cartridge as recited in claim 8 wherein:

the depth of the cavity is about 1.00 mm, and the protuberance projects a distance of about 1.38 mm prior to welding.

11. A cartridge as recited in claim 7 wherein:

prior to welding there is a clearance space on each side of the protuberance residing within cavity.

12. A method of restricting spread of a flash from a weld formed when a pair of housing portions of a cartridge are welded together, comprising:

mating a first housing portion to a second housing portion by inserting a protuberance projecting from an edge of the first housing portion into a cavity formed in an edge of the second housing portion, the mated housing portions forming a pocket therebetween for receiving a memory chip and the mated housing portions forming an opening above the pocket allow electrical contact with the memory chip residing in the pocket;

welding the protuberance within the cavity; and containing a flash formed by welding within the cavity.

13. A method as recited in claim 12 further comprising the step of:

providing a space on each side of the protuberance within the cavity to contain the flash and prevent the flash from entering the opening.

* * * * *